C. O'Bryan,
Hollow Auger.
N° 25,791.  Patented Oct. 11, 1859.
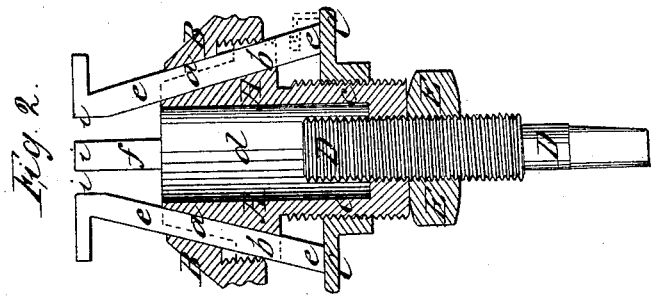
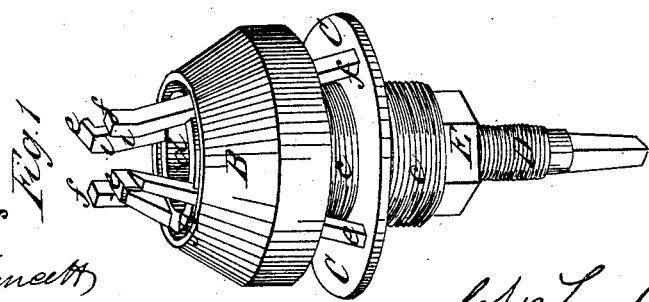
Witnesses
John M Fawcett
Henry Kreps
Inventor
Chas O'Bryan

UNITED STATES PATENT OFFICE.

CHARLES O'BRYAN, OF SALEM, OHIO, ASSIGNOR TO HIMSELF AND JOSEPH S. HALDEMAN, OF SAME PLACE.

TOOL FOR CUTTING ROUND TENONS.

Specification of Letters Patent No. 25,791, dated October 11, 1859.

*To all whom it may concern:*

Be it known that I, CHARLES O'BRYAN, of Salem, in the county of Columbiana and State of Ohio, have invented certain new and useful Improvements in Expansive Hollow Augers; and I do hereby declare the following to be a full, clear, and exact description of the construction and operation of the same, reference being had to the accompanying drawings, making a part of this specification, in which—

Figure 1 is a perspective of the auger, and Fig 2, vertical section through the same.

Similar letters of reference where they occur in the separate figures denote like parts of the instrument in both of them.

I am aware that boring or cutting heads have been made conical, and that the knives or bits have been arranged thereon so as to point toward the apex of the cone—and further that, by a peculiar mechanism connected with the machine, the knives or bits could be moved in their rests or seats. But this has been done in large machines, organized for a special purpose, and not of a portable character. I lay no claim to any such arrangement.

My invention consists in an expanding or adjustable hollow auger, in which the cutters lie on a beveled or conical surface, and have a plate or other support at their rear ends, and held or clamped in their seats by a conical nut, as will be hereafter described.

To enable others skilled in the art to make and use my invention, I will proceed to describe the same with reference to the drawings.

A represents a hollow head or mandrel made of iron, or other suitable metal, having a frustum of a cone ($a$) formed upon one of its ends, and in rear of this a flange $b$, with a female screw thread cut upon its periphery; and in rear of this, a cylindrical portion $c$, also furnished with a female screw thread. The bore $d$, of this stock, head, or mandrel should be large enough to admit the largest sized tenons, or sticks that are designed to be dressed by it. On the face of the frustum $a$, and through the flange $b$, are cut grooves of any suitable number—say four, pointing toward the apex of a cone of which $a$ is a frustum, and deep enough to allow the shanks of the bits $e$ placed therein to project from the face of the cone, but not from the perimeter of the flange $b$.

When the bits $e$, and the guide pieces $f$ (if guide pieces are used) are laid or inserted in these grooves, then the nut B, which has upon its interior the form in reverse, of the frustum and flange, is run down upon the stock or head A, its male screw thread taking in to the female thread in the flange $b$, and thus clamping tightly the bits and guide pieces in their grooves. There must, however, be some means of adjusting these bits so that they will all work in the same cutting path, else the work done by them would be rough. To effect this I use a ring or disk C, which has a male thread cut in its center portion, so as to run upon the portion $c$ of the stock or head A. And against this plate, which is adjustable on the portion $c$, the rear ends of the bits and guides rest, which gives them a permanent bearing, as well as their exact cutting or supporting positions.

The rear of the stock or head A, has a screw thread cut in it, into which a screw shank D is run—the interior end of which screw shank defines the length of tenon to be cut, when doing such work said adjusting shank being firmly held in its proper position when adjusted by a jam nut E or its equivalent. When used for cutting or forming longer pieces such as brush or broom handles, the screw shank is removed and then the turned stick may pass clear through the boring or cutting instrument.

The knives $e$ may have any suitable cutting edges or points upon them—and I prefer to use between the bits, guides or supports $f$ to steady and direct the material that is being operated upon by the knives or bits.

The bits and guides may be run out, or drawn in, at any time, to change the diameter of the thing that is being formed by them as follows: viz: by loosening the nut B, the bits and guides become loose and then by turning the plate C, they can be forced forward, or by running the plate back, and holding the tool in an upright position, they will slide back in their grooves, continuing to rest upon said plate, and when they are in the position desired, the nut B, is tightened up upon its screw thread, and the bits and guides will then be clamped in place. If preferred, there may be a flange on the plate C, which will take into slots in the ends of the bits and guides, as shown by red lines on the right hand side of Fig. 2, so that the turning of the plate in either direction will carry said bits and guides with it, by a positive motion. But as the bits and guides change their relative positions in regard to each other as they are run forward or backward, the flange on the plate C, must be long enough, and the slots in the bits and guides deep enough to catch each other under these changes. Both the bits and guides are so formed, on their parts that are next to the wood or other material being acted upon, as to make a circular supporting surface for said material, as shown at $i$ in the drawings. The tool or instrument may be screwed into or in any other manner fastened to the chuck or mandrel of a lathe—or it may be used in an ordinary bit-stock, as may be preferred.

Having thus fully described the nature and object of my expanding hollow auger, what I claim therein as new and desire to secure by Letters Patent is—

The combination of the hollow conical head A, external nut B, and plate C, constructed and arranged as described, for adjusting, and holding when adjusted the bits or cutters or their guides, substantially as represented.

CHAS. O'BRYAN.

Witnesses:
 JOHN W. FAWCETT,
 HENRY KREPS.